United States Patent [19]
Kelley

[11] 3,720,446
[45] March 13, 1973

[54] REAR DUMPING VEHICLE

[75] Inventor: Douglas M. Kelley, Chesterland, Ohio

[73] Assignee: Euclid, Inc., Cleveland, Ohio

[22] Filed: Feb. 16, 1971

[21] Appl. No.: 115,480

[52] U.S. Cl. ..................... 298/22 R, 180/64, 180/65
[51] Int. Cl. .............................................. B60p 1/16
[58] Field of Search....180/64 R, 54 R, 65; 298/22 R, 298/22 P, 17 R

[56] References Cited

UNITED STATES PATENTS

| | | | |
|---|---|---|---|
| 3,211,498 | 10/1965 | Peller | 298/22 P |
| 3,552,798 | 1/1971 | Cole | 298/22 R |
| 2,587,057 | 2/1952 | McVeigh | 180/54 R |
| 3,565,202 | 2/1971 | Evans | 180/65 R |
| 2,557,082 | 6/1951 | Double | 298/17 R |

OTHER PUBLICATIONS

Caterpillar Product Line – Advertising Brochure of Caterpillar Tractor Co.; Peoria Ill. – Item 779

*Primary Examiner*—Richard J. Johnson
*Attorney*—Watts, Hoffmann, Fisher & Heinke

[57] ABSTRACT

A four wheel rear dumping truck in which the center of gravity of the truck is located substantially along a vertical line between forward and rear truck wheels in both the loaded and unloaded conditions of the truck so that wheel loadings are proportionately the same whether the truck is loaded or unloaded.

Each wheel is independently driven by an electric motor. Electrical power is supplied by a prime mover located between the fore and aft wheels. The dump body is supported over the prime mover and is shaped so that the material forming the load has a center of gravity located above the location of the center of gravity of the unloaded truck.

10 Claims, 3 Drawing Figures

PATENTED MAR 13 1973    3,720,446

INVENTOR.
DOUGLAS M. KELLEY
BY Watts, Hoffmann,
Fisher & Heinke
ATTORNEYS.

REAR DUMPING VEHICLE

CROSS REFERENCED PATENT APPLICATIONS

U. S. Ser. No. 63,444, filed Aug. 13, 1970, entitled EXHAUST SYSTEM FOR A LOAD DUMPING VEHICLE by Henry E. Vincenty,.

U. S. Ser. No. 115,387, filed Feb. 16, 1971 entitled STEERABLE LOAD TRANSPORTING VEHICLE by Douglas M. Kelley,.

BACKGROUND OF THE INVENTION

1. Field of the Invention

The present invention relates to load dumping vehicles and more particularly relates to rear dumping dump trucks.

2. The Prior Art

Some prior art rear dumping trucks have been constructed with a front mounted engine, clutch and transmission, a dump body supported behind the driver's cab, and steerable front wheels located forwardly of the cab.

The location of the center of gravity of these trucks is shifted substantially between the loaded and unloaded conditions of the trucks. When the trucks carried no load, the center of gravity was located relatively forwardly of the dump body because of the mass of the prime mover and associated components. When the dump body was filled, the center of gravity was shifted rearwardly and vertically upwardly due to the large mass of the load and its elevation.

The shift in the center of gravity between the loaded and unloaded conditions of these trucks resulted in significant redistributions of the vehicle axle loadings. Accordingly, the traction and handling of the vehicles changed markedly between the loaded and unloaded conditions. These changes were due in part to the construction of wheel suspensions which were required to be designed to function appropriately under relatively large loads.

To minimize the changes in weight distributions on the wheels caused by the center of gravity shifting, some prior art vehicles were constructed with the transmissions and drive trains between the front and rear wheels. These proposals markedly improved the weight distribution on the wheels when the trucks were unloaded but the weight was still required to be unevenly distributed on the wheels to enable substantially equal weight distributions when the truck was loaded.

Because of the horizontally variable center of gravity locations, the previously proposed rear dump truck designs generally tended to accommodate the loaded condition of the trucks with concomitant sacrifices in handling, ride, stability and traction when the trucks were unloaded. In some trucks, for example, multiple axles were provided beneath the dump body to support the loads. These axles were usually closely spaced, frequently carried dual tires and were thus individually relatively lightly loaded when the trucks were unloaded. In off-the-road vehicles, these design shortcomings limited the ability of the vehicles to negotiate the kinds of terrain sometimes encountered. As might be expected, the design problems referred to increased in complexity as the load carrying capacity of such trucks increased.

As a consequence, extremely large capacity rear dumping trucks used in off-the-road environments such as strip mining, etc. have had the disadvantage of requiring some sacrifices in performance when unloaded in order to provide optimum handling when loaded.

SUMMARY OF THE INVENTION

According to the present invention, a new and improved rear dumping truck is provided which has a composite center of gravity which does not shift substantially in a forward or rearward direction relative to the vehicle between the loaded or unloaded conditions of the truck. This construction enables the wheel assembly loadings to be proportionately the same regardless of the loading of the truck.

In a preferred construction the new truck includes a chassis and a tiltable dump body supported on the chassis. The new truck is constructed and arranged to produce desired wheel assembly loadings which are proportionately the same whether the truck is loaded or unloaded. The center of gravity of the chassis and body is located on a vertical line through the truck centerline between fore and aft wheel assemblies of the truck. This location of the center of gravity causes the wheel assemblies to support desired proportions of the vehicle weight. Preferably, the wheel assemblies are equally loaded by the chassis and body.

The chassis includes four ground engaging wheel assemblies (two forward wheel assemblies and two aft wheel assemblies), a frame suspended by the wheel assemblies, and a prime mover supported by the frame. The frame also supports a driver's cab, storage tanks for fuel, hydraulic fluid, etc. and other systems and components as may be used on such a truck.

The prime mover is centrally located on the frame and includes a motor-generator unit formed by a gas turbine engine which drives an electric generator. The wheel assemblies each include an electric drive motor powered from the generator. This arrangement enables the weight of the motive power and vehicle drive system to be distributed equally to the wheel assemblies, or in desired proportions.

Parts of the chassis which overhang the fore and aft wheel assemblies, such as the driver's cab, hydraulic tank, etc., are of relatively small mass or are distributed about the chassis so that the center of gravity of the chassis is located at a desired position with respect to the wheel assemblies.

The dump body is connected to the frame for tilting motion between a payload carrying position and a dumping position. The dump body includes side walls and oppositely sloping bottom walls. The bottom walls are planar and slope downwardly toward each other. Their juncture defines a shallow V which is located between the fore and aft wheel assemblies. The dump body is supported on the frame adjacent this V by a pair of hydraulic rams located on opposite sides of the vehicle center-line and substantially in a vertical plane with the center of gravity of the dump body.

The centers of gravity of the chassis and of the body are located on a substantially vertical line passing through the centerline of the vehicle. The composite center of gravity of the new truck, when unloaded, lies on a generally vertical line extending through the longitudinal centerline of the truck and between the fore and aft wheel assemblies. The wheel assemblies therefore support desired proportions of the unloaded vehicle weight depending upon the location of the composite center of gravity between the fore and aft assemblies. Preferably, the composite center of gravity is located midway between the wheel assemblies so that the wheel assemblies are all equally loaded and exhibit substantially equal traction.

The dump body construction is such that when the dump body is loaded, the center of gravity of the payload in the dump body is vertically aligned with the centers of gravity of the dump body and the chassis. Accordingly, when the dump body is loaded the composite center of gravity of the loaded truck is vertically aligned with the composite center of gravity of the unloaded truck. This assures that the wheel assembly loadings are proportionately the same whether the truck is loaded or unloaded.

In the preferred construction, each wheel assembly is equally loaded and hence each wheel assembly bears the same load as all the others whether the truck is loaded or unloaded. Because of this arrangement therefore, the wheel assemblies exhibit equal traction whether the truck is unloaded or loaded and the stability, handling, etc. of the vehicle is not significantly altered between the loaded and unloaded conditions.

A principal object of the present invention is the provision of a new and improved rear dumping truck in which the composite center of gravity of the truck does not shift appreciably laterally of the truck between the loaded and unloaded conditions of the truck so that wheel loadings are proportionately the same whether the truck is loaded or unloaded.

Other objects and advantages of the invention will become apparent from the following detailed description thereof made with reference to the accompanying drawings which form a part of the specification.

DETAILED DESCRIPTION OF A PREFERRED EMBODIMENT

Figure 1:
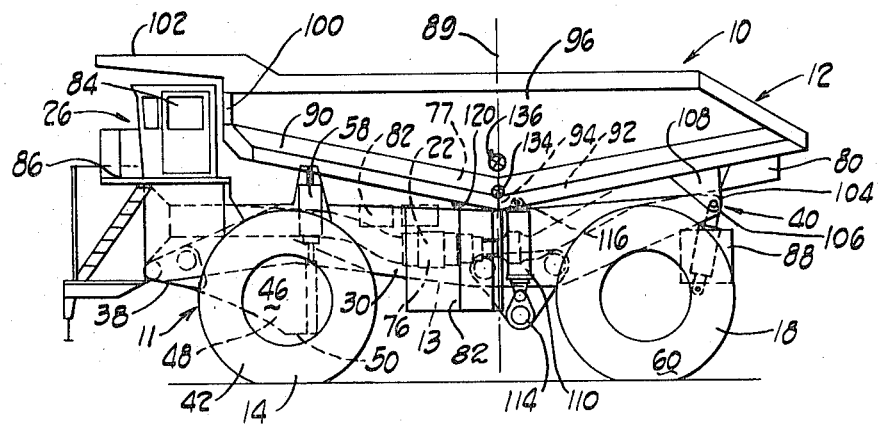
FIG. 1 is a horizontal elevational view of a truck constructed according to the present invention and constituting one preferred embodiment.
Figure 2:
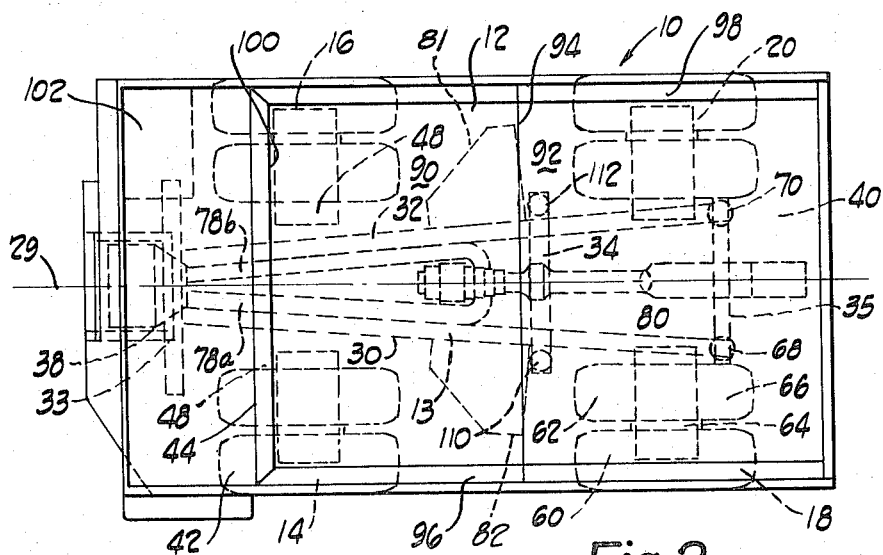
FIG. 2 is a top plan view of the truck shown in FIG. 1.
Figure 3:
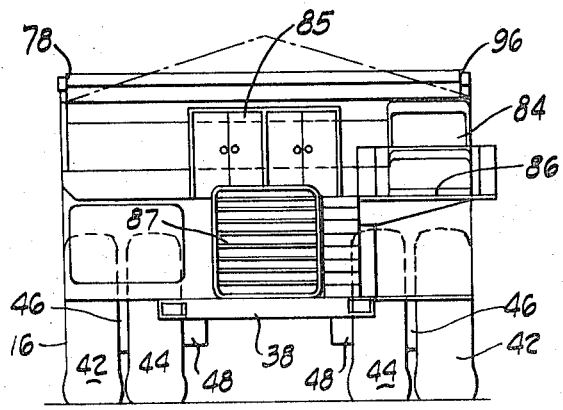
FIG. 3 is a front elevational view of the truck shown in FIG. 1.

A rear dumping truck 10 embodying the present invention is shown in FIG. 1. The truck 10 includes a chassis 11 and a tiltable dump body 12 supported by the chassis 11. The chassis components and the dump body are constructed and arranged so that the truck wheel loadings are substantially equal whether the dump body 12 is loaded or unloaded.

The chassis 11 includes a frame 13; forward wheel assemblies 14, 16; aft wheel assemblies 18, 20; a prime mover generally designated at 22; and a control section 26. The frame 13 is symmetrical about the longitudinal centerline of the truck and is wedge-shaped when viewed in plan because it comprises longitudinal frame members 30, 32 which diverge at an acute angle proceeding rearwardly along the truck. The frame members 30, 32 are connected by cross braces 33–35. The cross brace 33 is located adjacent the forward end 38 of the frame, the cross brace 35 is located near the aft end 40 of the frame, and the brace 34 is located between the braces 33, 35.

The forward wheel assemblies 14, 16 are individually driven and are steerable. Each wheel assembly includes dual tires 42, 44 which are mounted on a hub 46. The hub 46 houses an electric motor and drive transmission which are generally designated by the numeral 48 so that each wheel assembly is independently driven by associated electric motor. The forward wheel assemblies are connected to the frame 13 by a suspension frame 50. The frame 50 is hinged to the frame 13 at the forward end 38 for pivotal movement relative to the frame about a horizontal axis. The rearward ends of the suspension frame 50 supports the frame 13 by a pair of suspension springs 58 spaced equally from the longitudinal centerline of the truck. The wheel assemblies 14, 16 are pivoted to the frame 50 and are steerable as a unit by operation of a suitable hydraulically operated steering mechanism. The steering gear is illustrated and described in greater detail in the above referenced patent application to Kelley.

The rear wheel assemblies 18, 20 independently suspend the rear end of the frame and are individually driven. The rear wheel assemblies 18, 20 are identical and accordingly only the wheel assembly 18 is described in detail. The assembly 18 includes dual tires 60, 62 which are mounted on a hub 64. The hub 64 houses a motor and gear transmission designated by the reference character 66. The motor and transmission 66 enable the rear wheels of the vehicle to be driven independently of each other. The rear wheel assemblies 18, 20 each support the frame 13 via suspension units 68, 70, respectively. The suspension units 68, 70 are disposed between their respective wheel assemblies and the cross brace 35.

The frame 13, the prime mover 22, the control section 26 and other components supported by the frame have a composite center of gravity located along the longitudinal center line of the truck. This composite center of gravity is located between the forward and aft wheel assemblies by distributing the weight of the chassis components on the frame. The prime mover 22 comprises a motor-generator unit. The motor-generator unit includes a gas turbine engine 76 which drives an electrical power generator 77 (preferably an alternator). The engine 76 communicates with air intake ducts 78a, 78b which extend from the forward end of the truck to the compressor section of the engine. The engine exhaust is directed rearwardly of the truck through an exhaust duct 80. The exhaust system is described in greater detail in the above referenced patent application of Vincenty.

The prime mover 22 and associated apparatus are disposed along the longitudinal centerline 29 of the truck. This assures that the center of mass of this machinery is centered laterally on the chassis. Fuel tanks 81, 82 are fixed to the frame members 30, 32, respectively, and are symmetrical about the axis 29 so that the fuel weight is centered on the frame.

The control section 26 is supported by the forward end 38 of the frame 13 forwardly of the front wheel assemblies 14, 16. The unit 26 includes a driver's cab 84, an electrical control cabinet 85 and an access ladder and catwalk 86. The cab is formed by a sheet metal body and includes a driver's seat, controls and necessary instrumentation. The control cabinet contains control circuitry for governing the operation of the electrical system and this circuitry is accessible from the catwalk. The air intake for the ducts 78a, 78b is located below and forwardly of the catwalk and is covered by a suitable grill 87.

The weight of the control section 26 is a relatively small proportion of the weight of the chassis 11 and the components of the control section are distributed symmetrically about the vehicle centerline. The weight of the control unit is offset by the location of other vehicle components of the frame 13, such as by a hydraulic tank 88 which is attached to the frame 13 behind the rear wheel assemblies.

The dump body 12 is supported by the frame 13 above the prime mover 22 and over the forward and rear wheel assemblies. The dump body includes load supporting floor sections 90, 92 which are planar and downwardly sloping. These walls converge at a juncture 94 which forms a V-like base of the dump body located between the forward and rear wheel assemblies.

Vertical sidewalls 96, 98 extend upwardly from the sides of the bottom walls and a forward wall 100 extends upwardly from the forward end of the bottom wall 90. A protective barrier 102 extends forwardly of the wall 100 and over the control section to prevent damage to the control section from material falling from the dump body. The dump body is symmetrical about the truck centerline.

The dump body is connected to the rear end of the frame 13 by pivot constructions 104 on each frame member. The pivot constructions are identical and accordingly only one is described in detail. The pivot construction 104 includes pins 106 which are attached to the frame. The dump body carries arms 108 which project downwardly from the end and are journalled on the pins. The dump body thus pivots about a horizontal axis extending through the trunions 106 so that the load contained in the dump body is dumped from the rear of the vehicle.

The dump body is moved between its load carrying position (illustrated in the drawings) and its dumping position by telescoping hydraulic rams 110, 112. Each ram has a cylinder part anchored to the frame 13 by a pivot construction 114. A cylinder part at the opposite end of the ram is connected to the dump body by a pivot construction 116.

The dump body extends forwardly of the front wheel assemblies and overhangs the rear wheel assemblies. The V-shaped base of the base or juncture 94 of the bottom walls is located rearward of the front wheel assembly and substantially medially between the suspension spring units of the wheel assemblies. A bearer construction 120 is fixed to the dump body at the V-like juncture of the floor sections. The bearer 120 engages the frame 13 on either side of the line 89 so that when the dump body is in the position shown in FIG. 1, substantially all of the dump body load force is supported by the frame in a vertical plane including the line 89 and which plane extends transversely of the frame 13. This eliminates the application of any substantial moments on the frame which could alter the weight distribution in the wheel assemblies.

The composite center of gravity of the truck 10, without its payload, thus lies on the line 89 between the center of gravity of the chassis and the center of gravity of the dump body. The composite center of gravity of the unloaded truck 10 is located approximately as indicated by the reference numeral 134. With the center of gravity of the truck 10 so located, the loads applied to the wheel assemblies are nearly equal so that the traction of all of the wheels is about equal.

The dump body construction is configured so that when loaded, the center of gravity of the payload also lies substantially on the line 89. Hence, the composite center of gravity of the loaded truck lies on the line 89 between the center of gravity of the payload and the center of gravity of the chassis. Because of this construction, the weight distributions on the wheels are proportionately the same whether the truck is loaded or not. In the preferred truck 10, the line 89 is substantially centered on the frame 13 between the front and rear suspension spring units so that each wheel assembly is equally loaded whether the truck is loaded or unloaded.

When the dump body is loaded, the composite center of gravity of the vehicle is elevated to the location indicated by the reference numeral 136 but remains substantially on the line 89. As a result, the proportions of the load borne by the wheel assemblies remain the same after the truck is loaded.

While a single embodiment of the invention is described and illustrated in detail, the invention is not to be considered limited to the precise construction shown. It is intended to cover all adaptations and modifications of the invention coming within the scope of the following claims.

What is claimed is:

1. A rear dumping truck comprising:
   a. a chassis;
   b. a dump body supported on said chassis for tilting between a load carrying position and a load dumping position;
   c. said chassis comprising:
      1. fore and aft wheel assemblies for supporting and propelling the truck;
      2. a frame supported by said wheel assemblies comprising first and second spaced frame members extending longitudinally of said truck on opposite lateral sides of a longitudinal midline of the truck; and,
      3. a prime mover supported by said frame between said fore and aft wheel assemblies and substantially in a vertical plane passing through the longitudinal midline;
   d. said chassis and body having a composite center of gravity located between said fore and aft wheel assemblies and at least adjacent a vertical plane passing through the longitudinal midline; and,
   e. the center of gravity of said truck, when loaded, located in said vertical plane above the composite center of gravity of said chassis and said body whereby the proportion of the vehicle load borne by said fore and aft wheel assemblies is approximately the same whether the truck is loaded or unloaded.

2. A truck as claimed in claim 1 wherein said dump body includes payload supporting floor sections and retaining walls extending upwardly from said floor sections, said walls confining a payload in said dump body with the center of gravity of said payload substantially aligned with the center of gravity of said chassis and said dump body.

3. A truck as claimed in claim 2 wherein said dump body further includes bearer means engaging said frame at a location substantially in a plane transverse to said truck and passing through said center of gravity, said bearer means transmitting substantially all of the weight of said dump body and payload to said frame at said location.

4. A truck as claimed in claim 1 wherein said dump body further includes bearer means engaging said frame at a location substantially in a plane transverse to said truck and passing through said center of gravity, said bearer means transmitting substantially all of the weight of said dump body to said frame at said location.

5. A truck as claimed in claim 1 wherein said wheel assemblies include suspension units connected to said frame at longitudinally spaced locations for transmitting load forces from said frame to said wheel assemblies, said centers of gravity located in a substantially vertical plane transverse to said frame and intersecting said frame substantially medially of said suspension units.

6. A rear dumping truck comprising:
a. a frame structure defining a longitudinal axis and comprising at least first and second spaced longitudinal frame members extending along opposite sides of said longitudinal axis;
b. four wheel assemblies upon which said frame is suspended comprising a pair of forward wheel assemblies and a pair of rear wheel assemblies;
c. a prime mover supported by said frame between said forward and rear wheel assemblies and in a vertical plane passing through the longitudinal axis;
d. a dump body supported by said frame above said prime mover and connected to said frame for pivotal movement about an axis transverse to said frame;
e. said truck having a center of gravity located in a first vertical plane extending transversely of said frame between said forward and rear wheel assemblies and in a second vertical plane extending substantially through the longitudinal axis of said frame; and,
f. said dump body having bottom and side walls for supporting a mass of material having its center of gravity located vertically above said center of gravity of said truck in said second plane and close to said first vertical plane whereby the center of gravity of said vehicle does not shift an appreciable longitudinal distance between the loaded and unloaded conditions.

7. The vehicle claimed in claim 6 wherein said prime mover includes a motor-generator unit for producing electrical power, each of said wheel assemblies including an electric motor for driving said wheel assembly independently of the other wheel assemblies, said electric motors electrically connectable to said motor-generator unit.

8. The vehicle claimed in claim 7 wherein said motor comprises a gas turbine engine.

9. The vehicle claimed in claim 7 wherein said generator comprises an alternator.

10. A self-propelled rear dumping land vehicle comprising:
a. a chassis;
b. a dump body supported on said chassis for tilting between a load carrying position and a load dumping position;
c. said chassis comprising;
  i. fore and aft wheel assemblies for supporting and propelling the truck, said wheel assemblies each comprising an integral electric drive motor for driving the respective wheel assembly;
  ii. a frame supported by said wheel assemblies comprising first and second spaced frame members extending longitudinally of said truck between said fore and aft wheel assemblies on opposite lateral sides of a vertical plane passing through the longitudinal centerline of the truck;
  iii. a prime mover supported by said frame between said fore and aft wheel assemblies and along said vertical plane, said prime mover comprising a gas turbine engine and an electric power generating means drivingly connected to said engine for providing motive power to said drive motors;
d. said chassis defining a composite center of gravity located between said fore and aft wheel assemblies and substantially in said vertical plane; and,
e. the composite center of gravity of said truck when loaded located between said fore and aft wheel assemblies and substantially in said plane.

* * * * *